United States Patent

Iwanaga et al.

Patent Number: 5,518,513
Date of Patent: May 21, 1996

[54] DUST REMOVING APPARATUS

[75] Inventors: Atsumasa Iwanaga; Kiyoshi Nagashima; Tetsuya Ueda; Hisataka Urakata; Tetsuya Fujino, all of Nagasaki, Japan

[73] Assignee: Mitsubishi Jukogyo Kabushiki Kaisha, Tokyo, Japan

[21] Appl. No.: 307,056

[22] Filed: Sep. 16, 1994

[51] Int. Cl.$^6$ ............................................. B01D 46/00
[52] U.S. Cl. ............................ 55/302; 55/523; 95/280
[58] Field of Search .......................... 55/283, 284, 302, 55/523; 95/278, 279, 280

[56] References Cited

U.S. PATENT DOCUMENTS

| | | | |
|---|---|---|---|
| 4,525,184 | 6/1985 | Tassicker | 55/302 |
| 5,094,673 | 3/1992 | Kilicaslan et al. | 55/302 |
| 5,143,530 | 9/1992 | Haldipur et al. | 55/302 |
| 5,284,498 | 2/1994 | Davis et al. | 55/302 |
| 5,328,492 | 7/1994 | Zievers et al. | 55/302 |
| 5,348,572 | 9/1994 | Jelich et al. | 55/302 |
| 5,421,847 | 6/1995 | Akitsu | 55/302 |

FOREIGN PATENT DOCUMENTS

| | | |
|---|---|---|
| 0124863 | 11/1984 | European Pat. Off. . |
| 2426228 | 12/1979 | France . |
| 91/00769 | 1/1991 | WIPO . |

*Primary Examiner*—C. Scott Bushey
*Attorney, Agent, or Firm*—Wenderoth, Lind & Ponack

[57] ABSTRACT

A dust removing apparatus suppresses pressure and temperature variations of cleaned gas to facilitate the removal of dust. A clean gas chamber delimited by a plurality of porous ceramic tubular filter elements is divided in two by a partition wall. The respective chambers are connected through discrete outlet pipes to a clean gas main pipe, and backwashing devices are provided in the respective outlet pipes. Furthermore, a porous ceramics filter element is provided on a bottom partition plate so that the gas flow velocity in the tubular filter elements can be insured to prevent dust from adhering thereto.

4 Claims, 6 Drawing Sheets

DUST-CONTAINING GAS

DUST

DUST REMOVING APPARATUS

BACKGROUND OF THE INVENTION

1. Field of the Invention

The present invention relates to a dust removing apparatus for removing dust from gas exhausted from a combustor of fossil fuel such as coal, an iron manufacturing plant, a cement plant, a chemical plant and the like.

2. Description of the Prior Art

One example of a dust removing apparatus for removing dust from high-temperature gas in the prior art is shown in section in FIG. 7. In this heretofore known dust removing apparatus, a plurality of porous ceramic tubes 01 are arrayed along the direction of flow of a dust-containing gas within a casing 02 that is disposed nearly vertically. The dust-containing gas having flowed into the casing 02 through a dust-containing gas inlet 03 at the top of this casing 02 flows into the respective porous ceramic tubes 01 and has its dust removed while passing from the inside to the outside tube walls. The cleaned gas then flows out through a clean gas outlet 04. On the other hand, the dust removed from the dust-containing gas is led to a dust hopper 05 at the bottom of the casing 02 and is exhausted therefrom. It is to be noted that the top and bottom ends of the respective porous ceramic tubes 01 are respectively supported by header plates (partition plates) 06.

In the above-described heretofore known dust removing apparatus shown in FIG. 7, because dust may adhere to and accumulate on the inner tube surfaces of the ceramic tubes 01 performing the filtering action, high-pressure backwashing air is intermittently injected against the tubes 01 from the clean gas side, that is, from the outer surfaces of the ceramic tubes 01 so that the adhered dust is forced off of the inner surfaces.

However, the above-described dust removing apparatus presents a problem in that when the backwashing is effected simultaneously over the entire region as described above, a disturbance is created in the flow of the clean gas. Also dust freed from the tubes during the backwashing operation would disperse in the dust-containing gas, and hence a large proportion of the dust would have to be refiltered in the next filtering operation.

Another example of a dust removing apparatus for removing dust from high-temperature gas by making use of porous ceramic tubes in the prior art is shown in section in FIG. 8. In this dust removing apparatus, two stages (upper and lower) of a plurality of open-ended porous ceramic tubes 012 are spaced vertically apart in a casing 011. Upper and lower ends of the tubes 012 of each stage are supported, respectively, by header plates 013. The inside of the casing 011 is partitioned into an upper space 015 communicating with a gas inlet 014 at the top of the casing 011, a central space 017 communicating with a clean gas outlet 016 in the middle portion of the casing 011, and a lower space 019 communicating with a dust hopper 018 at the bottom of the casing 011. A dust-containing gas 020 such as a boiler combustion gas or the like has its dust removed while passing through the respective ceramic tubes 012 from their inside to their outside, and flows through the respective clean gas outlet pipes 016 to a clean gas pipe 021.

In addition, in order to remove the dust adhered to the ceramic tubes 012, backwashing high-pressure air is intermittently fed from a compressed air source 022 through a backwashing valve 023 and air pipes 024 and is then injected from nozzles 025 through the respective clean gas outlet pipes 016 to the central space 017 of the casing 011.

In this heretofore known dust removing apparatus shown in FIG. 8, however, because the plurality of ceramic tubes 012 are open-ended tubes and the clean gas is extracted horizontally through the ceramic tube walls, at the lowermost portion (the outlet) of the respective ceramic tubes D, the downward gas flow velocity becomes zero as shown in FIG. 9 (the ordinate positions A–D corresponds to the levels A–D in FIG. 8). Hence, dust removed from the upper portions of the ceramic tubes would stagnate there, and it was difficult to exhaust the dust to an ash treatment system (not shown) positioned downstream of the dust hopper 018. And, in an extreme case, the ceramic tubes would be clogged by the dust. Furthermore, if abnormal combustion should occur in the upstream boiler or the like, injection of the backwashing air had the potential to induce after-burning.

One example of a dust removing apparatus in the prior art which resolved the above-described problems is disclosed in Japanese Patent Publication No. 3-24251 (1991). In this dust removing apparatus, which is shown in FIG. 10, in order to insure a gas flow velocity at the lowermost portions of the respective ceramic tubes 012, a dust-containing gas circulating line 046 extends from the lower space in the casing 011 up to the upper space 015 and a circulating pump 047 is connected to this line. It is to be noted that in FIG. 10, components identical to those shown in FIG. 8 are designated by like reference numerals and a detailed explanation thereof will be omitted.

However, the heretofore known dust removing apparatus shown in FIG. 10 still is subject to the following problem. That is, a circulating pump which can withstand a temperature of the gas as high as 850° C. does not actually exist at the present time and would in fact be difficult to be put into practice. And even if such a pump could be put into practice, the efficiency of the dust removing apparatus itself would be low due to the circulating of the gas.

SUMMARY OF THE INVENTION

The present invention has been developed in order to resolve the above-mentioned problems of the dust removing apparatus in the prior art, and it is one object of the present invention to provide an improved dust removing apparatus which does not apply disturbances due to pressure variations or temperature variations to the downstream side of the apparatus whereat the clean gas flows, in which a dust-containing gas flow velocity proximate the lowermost ends of the ceramic tubes can be insured without the use of any special device such as a circulating line or a circulating pump, and in which only a little dust will accumulate on the inner surfaces of the ceramic tubes.

According to the present invention there is provided a dust removing apparatus including a casing, a filter block section disposed in the casing and composed of a plurality of porous ceramic filter elements outer surfaces of which delimit a clean gas chamber with said casing, and a partition wall surrounding some of the filter elements to divide the clean gas chamber into a plurality of chambers. The chambers are connected to a common clean gas main pipe through independent outlet pipes respectively. The apparatus also includes backwashing devices for injecting backwashing air into the chambers at locations just in front of (upstream of) locations where the outlet pipes communicate with the clean gas main pipe.

Accordingly, the groups of filter elements in the respective chambers can be backwashed independently. Hence it is possible to effect dust removal (filtering) in one chamber and to simultaneously perform backwashing in another chamber. Thus, pressure and temperature variations of the cleaned gas can be greatly suppressed, and the dispersing of dust in the dust-containing gas region can be prevented.

The backwashing devices are designed so that at least either one of the operating times and operating frequencies thereof can be made different. Again, when the operating cycles of the backwashing devices differ, pressure and temperature variations in the cleaned gas are suppressed, and the dispersing of dust is prevented.

According to the present invention, there is also provided a dust removing apparatus including a casing, a gas inlet at the top of the casing a dust hopper of the bottom of the casing, one or a plurality of filter block sections provided with porous ceramic filter elements disposed nearly vertically and arrayed along a direction of gas within the casing, backwashing devices for backwashing the filter block section or sections with backwashing air, a bottom partition plate disposed at the bottom of a final filter block section, a porous ceramic filter mounted to the bottom partition plate, clean gas chamber into which gas filtered by the porous ceramic filter element mounted to the bottom partition plate, and another clean gas chamber into which gas filtered by the filter element block section(s) flows, the clean gas chambers communicating with each other.

Accordingly, the flow velocity of the dust-containing gas is insured even at the bottom ends of the porous ceramic filter elements of the final filter block section. Hence, dust is surely removed from the bottom ends, and the problems caused by accumulating and stagnating dust are eliminated. In addition, since the clean gas chamber into which the gas filtered by the porous ceramic filter element mounted to the bottom partition plate flow communicates with the clean gas chamber into which gas filtered by the filter elements of the filter block section flow, that porous ceramic filter element would be backwashed along with the filter elements of the filter block section. Therefore, dust can be removed efficiently.

The above-mentioned and other objects, features and advantages of the present invention will become more apparent by referring to the following description of preferred embodiments of the present invention taken in conjunction with the accompanying drawings.

DETAILED DESCRIPTION OF THE PREFERRED EMBODIMENTS

Figure 1:
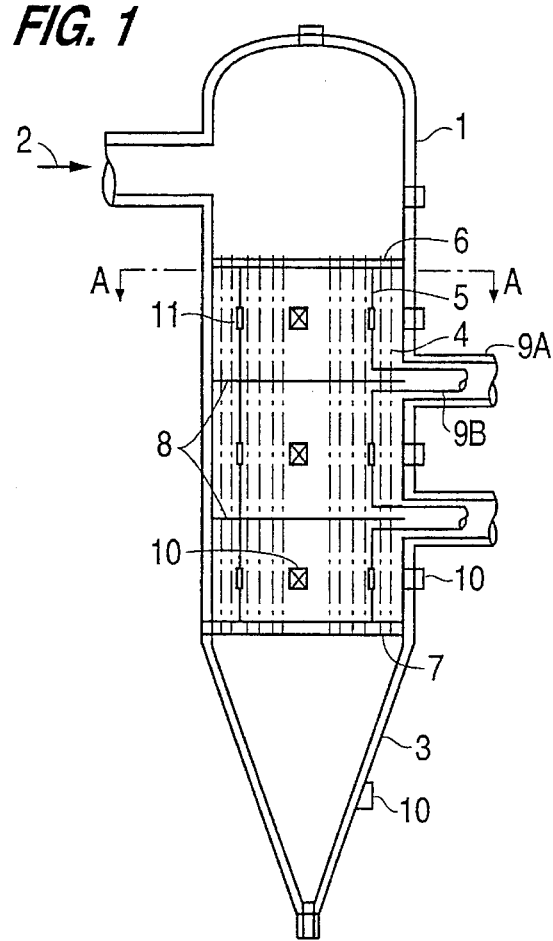
FIG. 1 is a general vertical sectional view of a first preferred embodiment of a dust removing apparatus according to the present invention.
Figure 2:
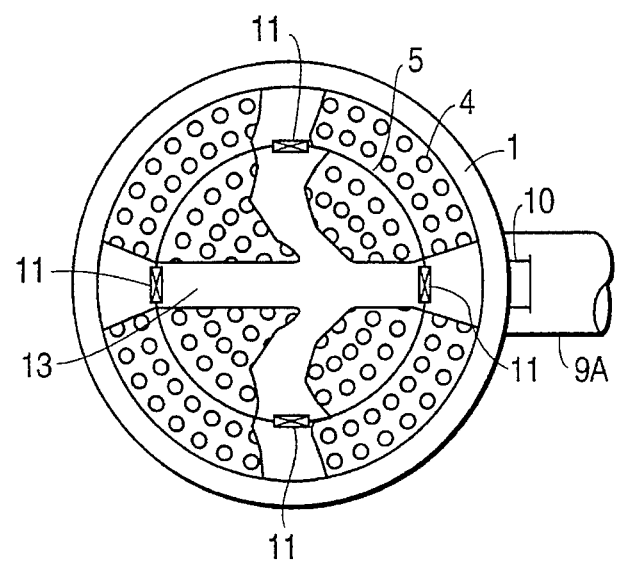
FIG. 2 is a sectional view of the same taken along line A—A in FIG. 1.
Figure 3:
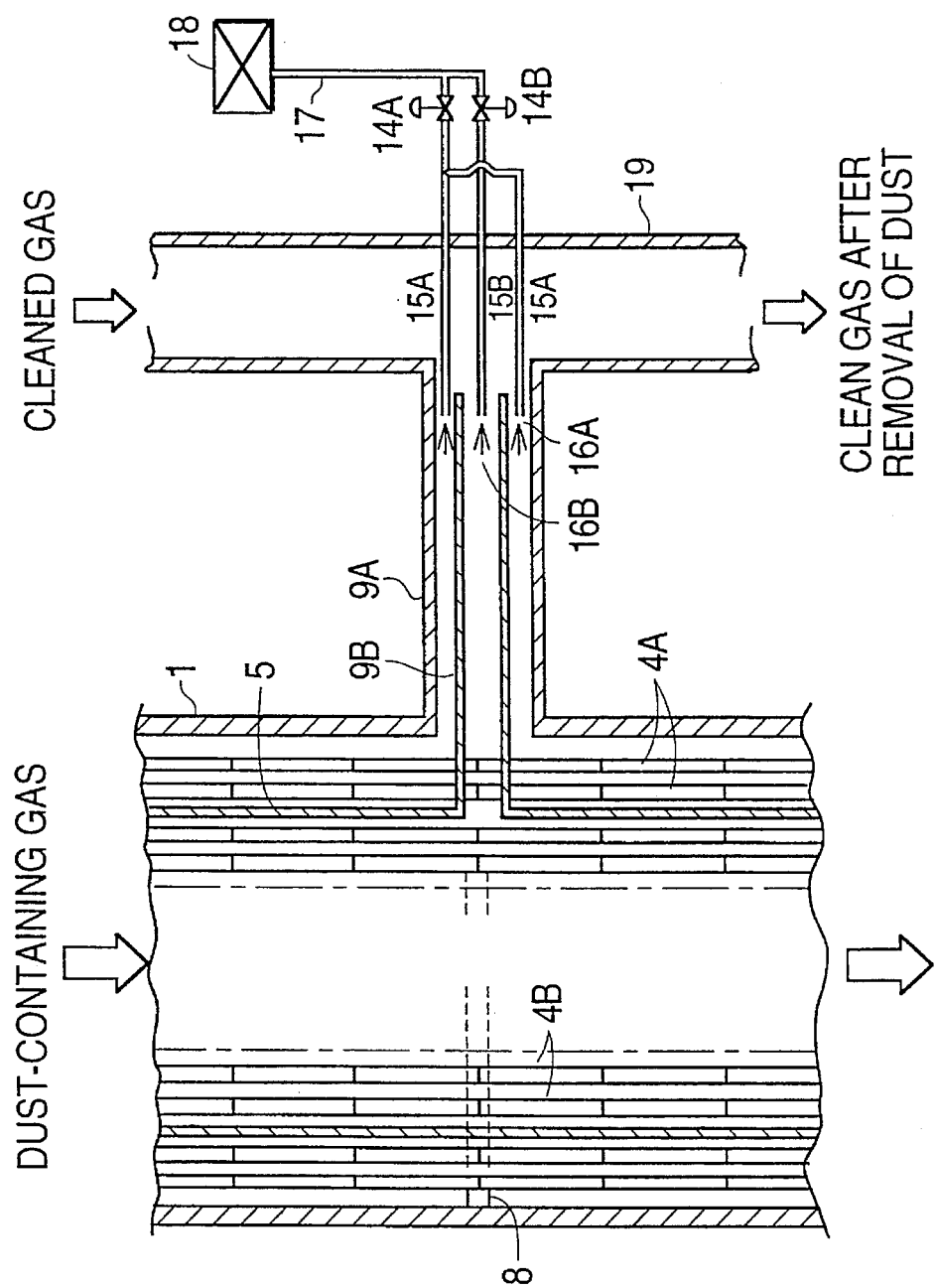
FIG. 3 is a detailed cross-sectional view of an essential part of the same preferred embodiment.

Now, a first preferred embodiment of the present invention will be described with reference to FIGS. 1 to 3. In this first preferred embodiment, as shown in FIG. 1, a single filter block section composed of a plurality of filter elements each consisting of a cylindrical porous ceramic body is provided within a casing 1 disposed nearly vertically. The casing 1 has a dust-containing gas inlet 2 at the top thereof and a dust hopper 3 connected to the bottom thereof. This block section includes a plurality of porous ceramic cylindrical filter elements 4 fixed to or gripped by a top header plate 6, a bottom header plate 7 and two intermediate header plates 8, and an inner cylindrical partition wall 5. As shown in FIG. 3, the inner partition wall 5 divides the plurality of filter elements 4 into two tube groups consisting of a group of outside filter elements 4A and a group of inside filter elements 4B. At the same time, the inner cylinder partition wall 5 also divides the clean gas chamber into two chambers.

Two clean gas outlet pipes 9A integral with the side wall of the casing 1 are provided at the same levels as the two intermediate header plates 8, respectively. These clean gas outlet pipes 9A are connected to a clean gas main pipe 19 (FIG. 3) outside of the casing 1, and the clean gas chamber formed outside of the inner partition wall 5 communicates with the clean gas main pipe 19 through the clean gas outlet pipes 9A. Also, clean gas outlet pipes 9B opening into the inner cylindrical partition wall 5 are provided within and concentric to the respective clean gas outlet pipes 9A. The clean gas outlet pipes 9B also communicate with the clean gas main pipe 19, and the clean gas chamber formed inside of the inner partition wall 5 communicates with the clean gas main pipe 19 through these clean gas outlet pipes 9B. As described above, the clean gas outlet pipes 9A and 9B for placing the respective ones of the clean gas chambers in communication with the clean gas main pipe 19 are concentric pipes, and until they open into the clean gas main pipe 19 the interiors thereof are kept separate from each other.

As best seen in FIG. 3, at the positions just upstream of the clean gas main pipe 19, backwashing devices 15A for the outer pipe group and backwashing devices 15B for the inner pipe group are equipped within the clean gas outlet pipes 9A and the clean gas outlet pipes 9B, respectively. These backwashing devices 15A and 15B include backwashing control nozzles 16A and 16B. Backwashing air may be fed to the backwashing devices from a common high-pressure air source 18 through an air pipe 17.

It is to be noted that reference numeral 10 designates manholes provided in the casing 1 and the dust hopper 3, and numeral 11 designates manholes provided in the inner partition wall 5. Furthermore, no filter elements 4 are provided for an appropriate distance in the diametrical direction or the like between the manholes 11 and the clean gas outlet pipes 9B, and walking passages 13 are formed at these locations along the intermediate header plates 8 and the bottom header plate 7.

In the illustrated embodiment, gas flowing into the casing 1 through the dust-containing gas inlet 2 enters the filter elements 4. Dust is removed from the gas while it is flowing through the filter elements 4 from their inside to their outside. Then, the (filtered) clean gas located in the respective clean gas chambers, separated by the inner partition wall 5, flows through the clean gas outlet pipes 9A and 9B, respectively, into the common clean gas main pipe 19, from where the gas is fed downstream to an appropriate device. On the other hand, dust removes from the gas by the respective filter elements 4 falls into the dust hopper 3.

In addition, by actuating the respective backwashing devices 15A and 15B so as to inject backwashing air into clean gas outlet pipes 9A, 9B with the backwashing nozzles 16A and 16B, the outside group filter elements 4A and the inside group of filter elements 4B are backwashed independently of each other.

In the above-described preferred embodiment, the clean gas chamber is divided in two by the inner partition wall 5 and the divided clean gas chambers can be independently backwashed by the backwashing devices 15A and 15B from locations just upstream of the locations where the discrete clean gas outlet pipes 9A and 9B communicate with the clean gas main pipe 19. Accordingly, pressure and temperature variations of the clean gas can be greatly reduced by operating the backwashing devices 15A and 15B at different times and/or at different frequencies so that dust removal will be carried out in one clean gas chamber while backwashing is performed in the other clean gas chamber. Also, even if dust removal is carried out in one clean gas chamber while backwashing is performed in the other clean gas chamber, the dust in the one clean gas chamber will settle.

Furthermore, instead of the single filter block section of the first preferred embodiment, a plurality of filter block sections, i.e. primary, secondary and other sections can be provided. Likewise, instead of dividing the clean gas chamber in two as in the first preferred embodiment, the clean gas chamber could be divided into three or more chambers. These alternatives would further suppress the pressure and temperature variations of the clean gas, and further stabilize the settling of the dust.

Figure 4:
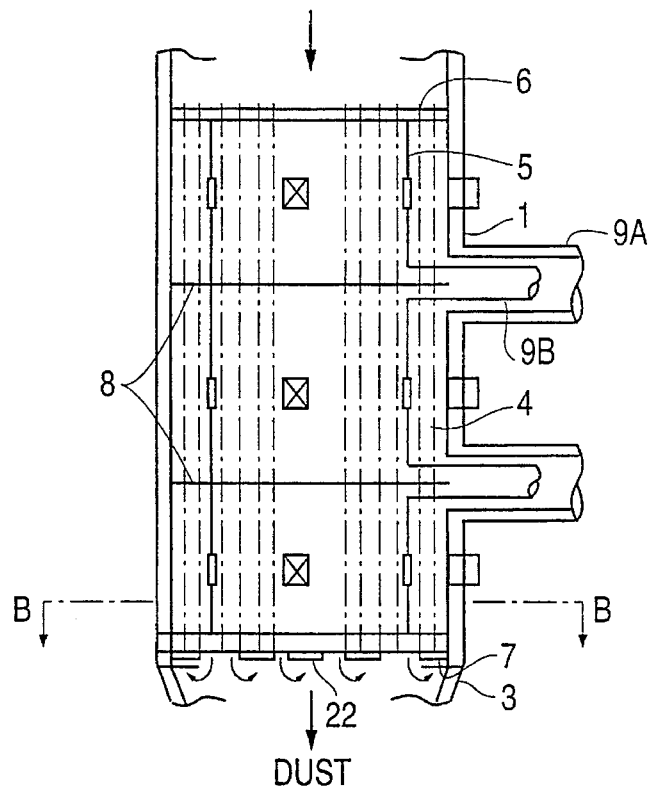
FIG. 4 is a general vertical sectional view of a second preferred embodiment of a dust removing apparatus according to the present invention.
Figure 5:
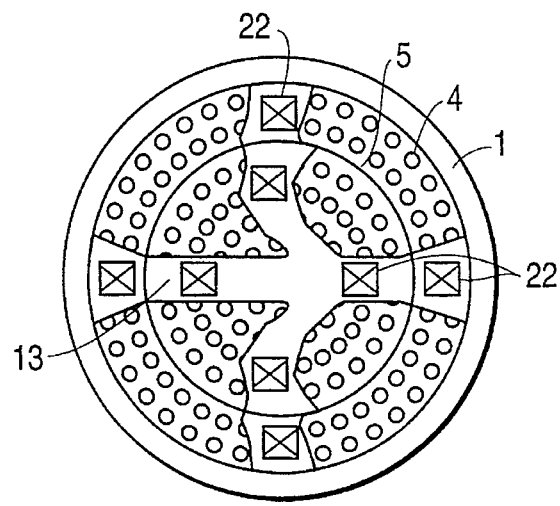
FIG. 5 is a sectional view of the same taken along line B—B in FIG. 4.
Figure 6:
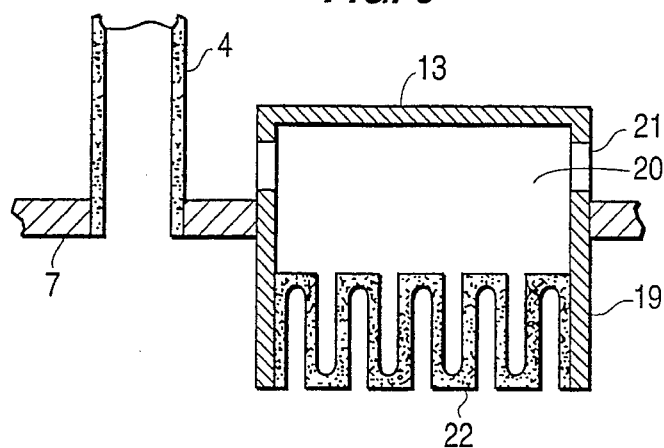
FIG. 6 is a detailed cross-sectional view of a part of a bottom header plate of the same preferred embodiment.
Figure 7:
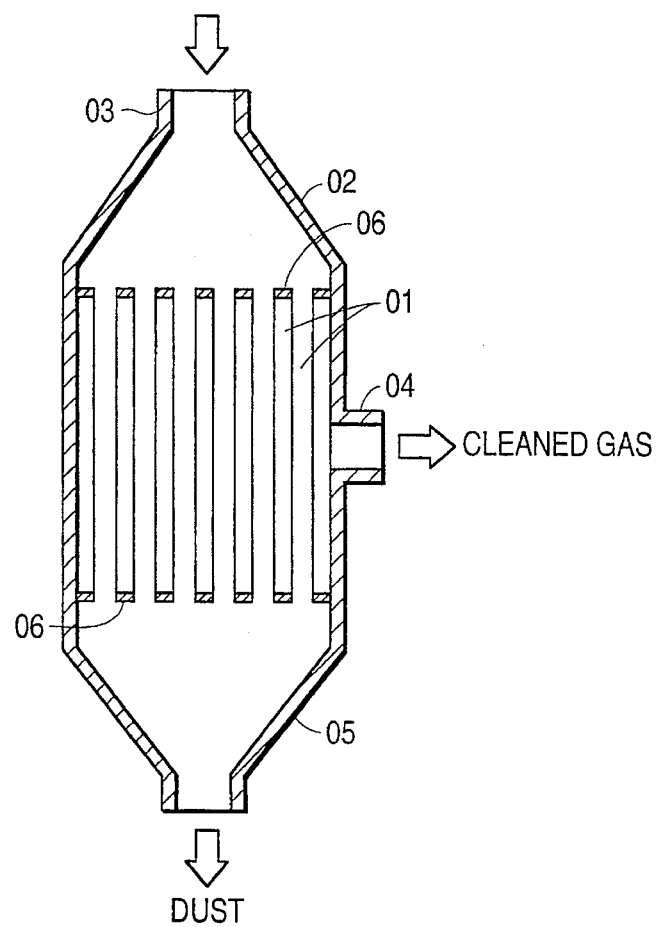
FIG. 7 is a vertical sectional view of one example of a dust removing apparatus in the prior art.
Figure 8:
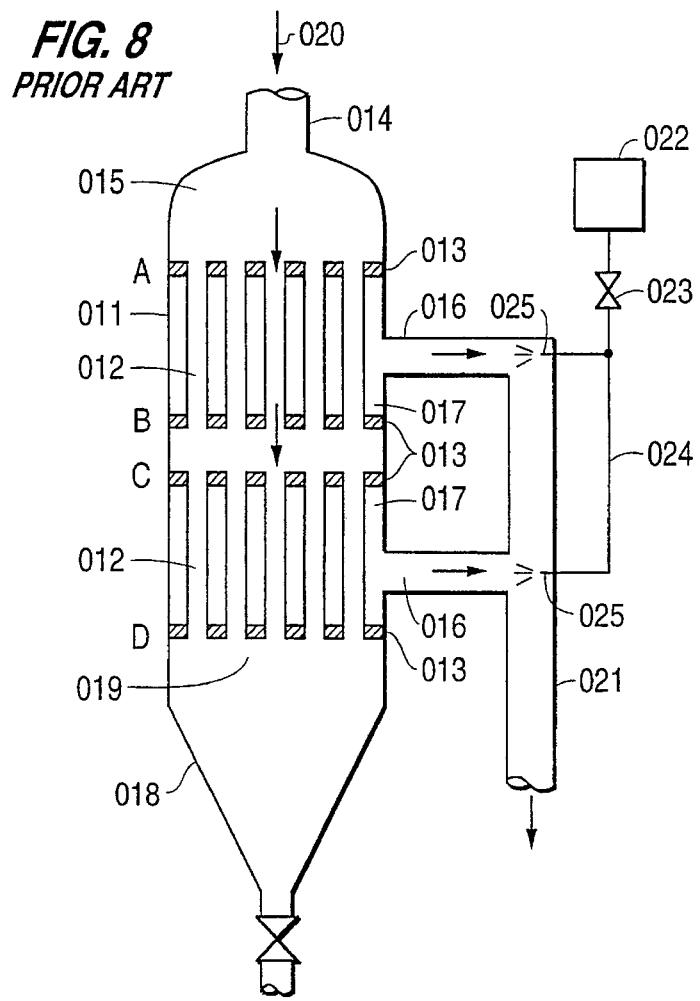
FIG. 8 is a vertical sectional view of another example of a dust removing apparatus in the prior art.

Next, a second preferred embodiment of the present invention will be described with reference to FIGS. 4 to 6. In FIGS. 4 to 6 component parts identical to those shown in FIGS. 1 to 3 are designated by like reference numerals and a detailed description thereof will be omitted.

In this second preferred embodiment, honeycomb ceramic filter elements 22 are mounted to the lower surface of the bottom header plate 7. As mentioned above, walking passages are provided on the bottom header plate 7 to allow the filter element block section within the casing 1 to be inspected. Since the tubular filter elements are not provided at these locations, the filter elements 22 can be mounted to the lower surface of the bottom header plate 7 right under the walking passages 13. In this preferred embodiment, since the clean gas chamber is divided into two chambers by the inner partition wall 5, four honeycomb filter elements 22 are provided for each of the respective clean gas chambers as shown in FIG. 5. It is to be noted that only two of these honeycomb filter elements 22 could be provided for each chamber at diametrically opposed positions, or other numbers of honeycomb filter elements could be used for each chamber.

As shown in FIG. 6, the honeycomb filter element 22 made of a porous ceramic is mounted to a ceramic body mounting member 19 which in turn extends though and is mounted to the bottom header plate 7. As dust-containing gas is drawn from the bottom of the casing through this element 22, the gas is filtered and clean gas is accommodated in a clean gas chamber 20 formed within the ceramic body mounting member 19. This cleaned gas chamber 20 communicates with the clean gas chamber of the filter block section via a clean gas outlet 21 provided in the ceramic body mounting member 19.

In this preferred embodiment, similarly to the first preferred embodiment, gas flowing into the casing 1 enters the tubular filter elements 4 made of porous ceramic and is filtered while flowing through the filter elements 4 from their inside to their outside. On the other hand, dust is removed from the gas flowing out of the bottom ends of the filter elements 4 by the honeycomb filter elements 22 made of porous ceramic. The clean gas then flows through the clean gas chambers 20 into a respective cleaned gas chamber of the filter block section associated with the mounting member 19 to which the honeycomb filter element 190 is mounted.

In addition, the filter elements 22 can be backwashed with high-pressure air from the clean gas chamber of the filter block section with which the filter elements are associated. Therefore, the filter elements 22 are backwashed simultaneously with the filter elements 4 of the filter block section.

Figure 9:
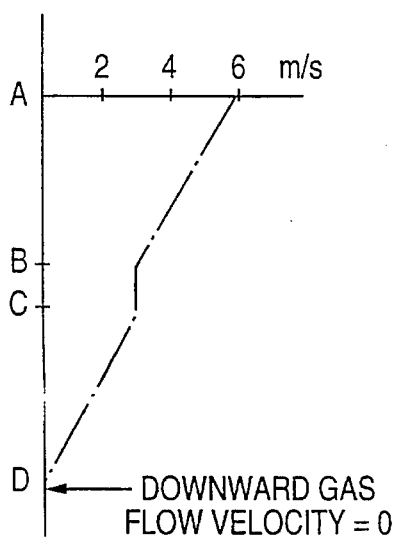
FIG. 9 is a diagram showing a distribution of a gas flow velocity within a ceramic tube in the dust removing apparatus shown in FIG. 8.
Figure 10:
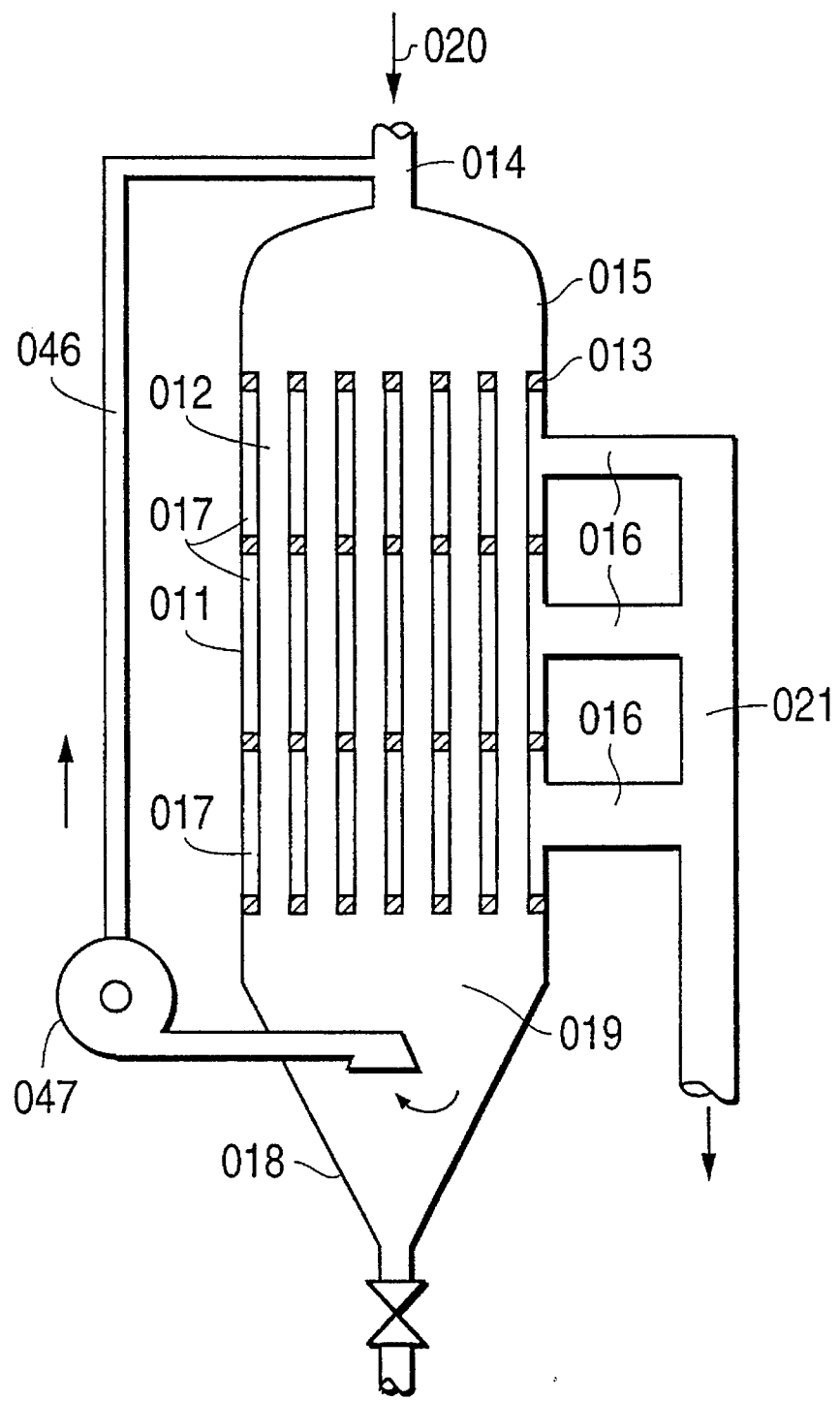
FIG. 10 is a vertical sectional view of still another example of a dust removing apparatus in the prior art.

In this preferred embodiment, the gas flow rate at the bottom ends of the tubular filter elements 4 made of porous ceramic is not zero but is equal to the filtering gas flow rate allowed by the honeycomb filter elements 22. As mentioned previously, FIG. 9 shows one example of a gas flow velocity distribution in a dust removing apparatus in the prior art. In the second preferred embodiment of the present invention, the flow velocity at point D in FIG. 9 would be a finite value such as, for example, about 0.5 m/s, and the respective gas flow velocities at points upstream of point D would also differ by the same increment from those shown in FIG. 9. Also, because the flow velocity of the dust-containing gas is large in the downward direction, the transfer of dust into the hopper is promoted.

While a principle of the present invention has been described above in connection with preferred embodiments of the invention, it is intended that all matter contained in the above description and illustrated in the accompanying drawings be interpreted as illustrative of the invention and not in a limiting sense.

What is claimed is:

1. A dust removing apparatus for removing dust from gas, said apparatus comprising: a casing having a top and a bottom; a gas inlet opening into said casing at the top of the casing; a hopper connected to the bottom of said casing; a plurality of tubular filter elements of porous ceramic extending axially vertically in the casing, each of said tubular filter elements having an open top end and an open bottom end, a clean gas chamber being defined between an inner wall surface of said casing and outer surfaces of said tubular filter elements; a plurality of vertically spaced-apart header plates supporting said tubular filter elements within said casing; a partition wall disposed within said casing as spaced inwardly therefrom, said partition wall extending around some of said tubular filter elements and inwardly of others of said tubular filter elements, said partition wall also extending between respective upper and lower ones of said header plates such that said partition wall divides said clean gas chamber into two clean gas chambers separated from one another within said casing, the two clean gas chambers being defined to the inside and to the outside of said partition wall, respectively; a first clean gas outlet pipe opening into said one of said two clean gas chambers so as to receive clean gas therefrom and extending to the outside of said casing; a second clean gas outlet pipe discrete from said first clean gas outlet pipe, said second clean gas outlet pipe opening into said other of said two clean gas chambers so as to receive clean gas therefrom and extending to the outside of said casing; a common clean gas main pipe disposed outside of said casing and communicating with both said first and said second clean gas outlet pipes so as to receive clean gas therefrom; and backwashing means for injecting backwashing media into said two clean gas chambers independently from backwashing locations upstream, in the direction of flow of gas through the clean gas outlet pipes, of locations where the clean gas outlet pipes first communicate with said common clean gas main pipe, respectively.

2. A dust removing apparatus as claimed in claim 1, wherein said backwashing means comprises backwashing nozzles disposed at said backwashing locations, respectively, and a respective valve connected to each of said nozzles, said valves being independently controllable.

3. A dust removing apparatus as claimed in claim 1, wherein said plurality of header plates include a bottom header plate disposed at the bottom of said casing, and further comprising filters of porous ceramic mounted to said bottom filter plate and operatively interposed between said hopper and said clean gas chamber, whereby said filters filter gas flowing from the bottom ends of said tubular filter elements back toward the clean gas chamber.

4. A dust removing apparatus as claimed in claim 2, wherein said plurality of header plates include a bottom header plate disposed at the bottom of said casing, and further comprising filters of porous ceramic mounted to said bottom filter plate and operatively interposed between said hopper and said clean gas chamber, whereby said filters filter gas flowing from the bottom ends of said tubular filter elements back toward the clean gas chamber.

* * * * *